Patented Dec. 13, 1949

2,490,875

UNITED STATES PATENT OFFICE 2,490,875

VINYL SULFIDES

Edward F. Landau, Newark, and Ernest P. Irany, Cranford, N. J., assignors to Celanese Corporation of America, a corporation of Delaware No Drawing. Application February 13, 1948, Serial No. 8,287

2 Claims. (Cl. 260—609)

This invention relates to the preparation of vinyl sulfides and relates more particularly to an improved process for the production of vinyl sulfides by a pyrolytic decomposition reaction.

An object of this invention is the provision of an efficient and economical process for the production of unsaturated sulfides containing a vinyl group.

Another object of this invention is the production of vinyl sulfides by the pyrolytic decomposition of symmetrical bis-ethylene sulfides whereby both vinyl sulfides and a mercaptan are obtained.

Other objects of this invention will appear from the following detailed description.

We have found that unsymmetrical vinyl sulfides may be obtained directly and in appreciable yield by subjecting a symmetrical, substituted bis-ethylene sulfide of the formula

to pyrolysis in an inert, oxygen-free atmosphere employing a pyrolytic reaction temperature of 350 to 500° C. In the above formula, R is a thermally stable, monovalent substituent and may be an alkyl group such as, for example, propyl, butyl, amyl, decyl, dodecyl or octadecyl group, a cyclohexyl group, an aryl group such as, for example, a phenyl or naphthyl group, and substituted phenyl or naphthyl groups such as a halogen or alkyl-substituted phenyl or naphthyl group, as well as an alkaryl group such as benzyl or phenyl-ethyl or a heterocyclic group.

Thus, for example, in pyrolyzing bis-phenyl ethylene sulfide, in accordance with our novel process, phenyl vinyl sulfide is obtained together with thiophenol as a by-product of the reaction. Again, by pyrolyzing bis-ethyl ethylene sulfide, ethyl vinyl sulfide and ethyl mercaptan are obtained. Our novel process enables vinyl sulfides such as, for example, propyl vinyl sulfide, butyl vinyl sulfide, amyl vinyl sulfide, decyl vinyl sulfide, cyclohexyl vinyl sulfide, naphthyl vinyl sulfide, tolyl vinyl sulfide, chlor-phenyl vinyl sulfide, nitro-phenyl vinyl sulfide, benzyl vinyl sulfide, 2-phenyl-ethyl-vinyl sulfide, and c-pyridyl vinyl sulfide to be obtained.

The pyrolytic decomposition reaction is preferably effected by vaporizing the symmetrical bis-ethylene sulfide employed in an atmosphere of nitrogen and then passing the vapors through a reaction chamber comprising a pyrolysis tube, preferably packed with an inert material such as glass beads, glass helices, porcelain or silica to provide an increased surface area for the pyrolytic reaction. The pyrolysis tube and packing are maintained at the desired pyrolytic reaction temperature by suitable heating means.

In order further to illustrate our invention, but without being limited thereto, the following example is given:

Example 50 parts by weight of bis-phenyl ethylene sulfide is slowly distilled under a pressure of 550 to 600 mm. of mercury in an atmosphere of nitrogen and the vapors passed through a pyrolysis tube packed with glass beads and heated to a temperature of 365 to 375° C. The mixture of reaction vapors leaving the pyrolysis tube is then condensed. The condensate, which is a brown oil, is treated with aqueous 10% sodium hydroxide, the aqueous layer separated and the residue then extracted three times with a suitable quantity of fresh ethyl ether for each extraction. The aqueous solution of the alkali-soluble portion is acidified with dilute hydrochloric acid and an oil separates which is then extracted with ether. The residue of the extract remaining after removal of the ether is thiophenol, a by-product of the reaction. The original ether extracts of the alkali-insoluble layer remaining after the caustic extraction are combined and then distilled. A fraction comprising 5.6 parts by weight and boiling at about 55° C. under a pressure of 8 mm. of mercury is obtained. The distillate is the desired phenyl vinyl sulfide. The undistilled portion constitutes unreacted bis-phenyl ethylene sulfide which may be recycled in the process. A satisfactory yield of phenyl vinyl sulfide is obtained.

It is to be understood that the foregoing detailed description is given merely by way of illustration and that many variations may be made therein without departing from the spirit of our invention.

Having described our invention, what we desire to secure by Letters Patent is:

1. Process for the production of unsymmetrical vinyl sulfides, which comprises subjecting to pyrolytic decomposition in an inert, oxygen-free atmosphere at a temperature of 350 to 500° C., a bis-ethylene sulfide of the formula $$R-S-CH_2CH_2-S-R$$

wherein R is a thermally stable, monovalent substituent.

2. Process for the production of phenyl vinyl sulfide, which comprises subjecting bis-phenyl ethylene sulfide to pyrolytic decomposition in an inert, oxygen-free atmosphere at a temperature of 365 to 375° C.

EDWARD F. LANDAU.
ERNEST P. IRANY.

REFERENCES CITED

The following references are of record in the file of this patent:

UNITED STATES PATENTS

| Number | Name | Date |
|---|---|---|
| 2,073,589 | Reppe et al. | Mar. 9, 1937 |
| 2,081,766 | Reppe et al. | May 25, 1937 |

FOREIGN PATENTS

| Number | Country | Date |
|---|---|---|
| 323,009 | Italy | Dec. 3, 1934 |